(12) United States Patent
Kang et al.

(10) Patent No.: US 9,214,002 B2
(45) Date of Patent: Dec. 15, 2015

(54) CONTENTS PROVIDING SCHEME USING DISPLAY HISTORY INFORMATION

(75) Inventors: Chan-Hui Kang, Yongin-si (KR); Jong-Cheol Kim, Seoul (KR)

(73) Assignee: KT Corporation, Seongnam (KR)

( * ) Notice: Subject to any disclaimer, the term of this patent is extended or adjusted under 35 U.S.C. 154(b) by 403 days.

(21) Appl. No.: 13/534,828

(22) Filed: Jun. 27, 2012

(65) Prior Publication Data
US 2012/0327093 A1 Dec. 27, 2012

(30) Foreign Application Priority Data
Jun. 27, 2011 (KR) .......................... 10-2011-0062291

(51) Int. Cl.
G06F 15/16 (2006.01)
G06T 1/00 (2006.01)
H04N 21/242 (2011.01)
H04N 21/472 (2011.01)
H04N 21/63 (2011.01)

(52) U.S. Cl.
CPC ................ *G06T 1/00* (2013.01); *H04N 21/242* (2013.01); *H04N 21/47217* (2013.01); *H04N 21/632* (2013.01)

(58) Field of Classification Search
CPC ............................................. H04N 5/77–5/772
USPC .................................. 386/224; 709/217, 219
See application file for complete search history.

(56) References Cited

U.S. PATENT DOCUMENTS

2006/0269220 A1* 11/2006 Ishido ............................. 386/52
2011/0179146 A1* 7/2011 Park ............................. 709/219
2011/0316671 A1* 12/2011 Yaguchi et al. .............. 340/5.83

* cited by examiner

*Primary Examiner* — Jacinta M Crawford
(74) *Attorney, Agent, or Firm* — Sughrue Mion, PLLC

(57) ABSTRACT

A device for using display history information is provided. The device includes an image information generation unit configured to generate image information of contents reproduced in a different device, an image information transmission unit configured to transmit the generated image information to a seamless service providing server and a display history information management unit configured to control the apparatus based on the received display history information which is received from the seamless service providing server. Here, the display history information corresponds to the transmitted image information.

20 Claims, 5 Drawing Sheets

CONTENTS PROVIDING SCHEME USING DISPLAY HISTORY INFORMATION

CROSS-REFERENCE TO RELATED PATENT APPLICATION

This application claims the benefit of priority from Korean Patent Application No. 10-2011-0062291, filed on Jun. 27, 2011 in the Korean Intellectual Property Office, the entire disclosure of which is incorporated herein by reference in its entirety.

BACKGROUND

1. Field

Exemplary embodiments broadly relate to contents providing scheme using display history information, and more specifically, exemplary embodiments relate to contents providing scheme using display history information based on image information.

2. Description of the Related Art

With recent development of communication technologies, the supply of devices that can provide contents such as mobile devices, tablet PCs, laptops, and TVs is proliferating. Further, a service for reproducing contents via multiple devices in cooperation with one another is becoming popular. Especially, as a user uses multiple devices, there is an increasing need for a service to enable contents being reproduced in a device to be immediately and seamlessly viewed in a different device.

SUMMARY

Accordingly, it is an aspect to provide contents providing scheme using display history information based on image information that is generated by capturing an image of the contents which is being reproduced in a different device.

According to an aspect of exemplary embodiments, there is provided an apparatus for using display history information. The device includes an image information generation unit configured to generate image information of contents reproduced in a first device, an image information transmission unit configured to transmit the generated image information to a second device, and a display history information management unit configured to control the apparatus based on the display history information which is received from the second device. Here, the display history information corresponds to the transmitted image information. The display history information management unit is a hardware component.

According to yet another aspect of exemplary embodiments, there is provided an apparatus for generating display history information. The apparatus includes an image information reception unit configured to receive, from a first device, image information of contents reproduced in a second device, a display history information generation unit configured to generate display history information based on the received image information and a display history information transmission unit configured to transmit the generated display history information to the first device, wherein the first device is controlled based on the transmitted display history information.

According to another aspect of exemplary embodiments, there is provided a method of using display history information. The method includes generating, by a hardware component of an apparatus, image information of contents reproduced in a first device, transmitting the generated image information to a second device receiving display history information from the second device, and controlling the first device based on the display history information. Here, the display history information corresponds to the transmitted image information.

In exemplary embodiments, it is possible to seamlessly provide contents being reproduced in a different device to another device by capturing an image of the contents being reproduced in the different device.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not intended to limit its scope, the exemplary embodiments will be described with specificity and detail taken in conjunction with the accompanying drawings, in which.

DETAILED DESCRIPTION OF EXEMPLARY EMBODIMENTS

Figure 1:
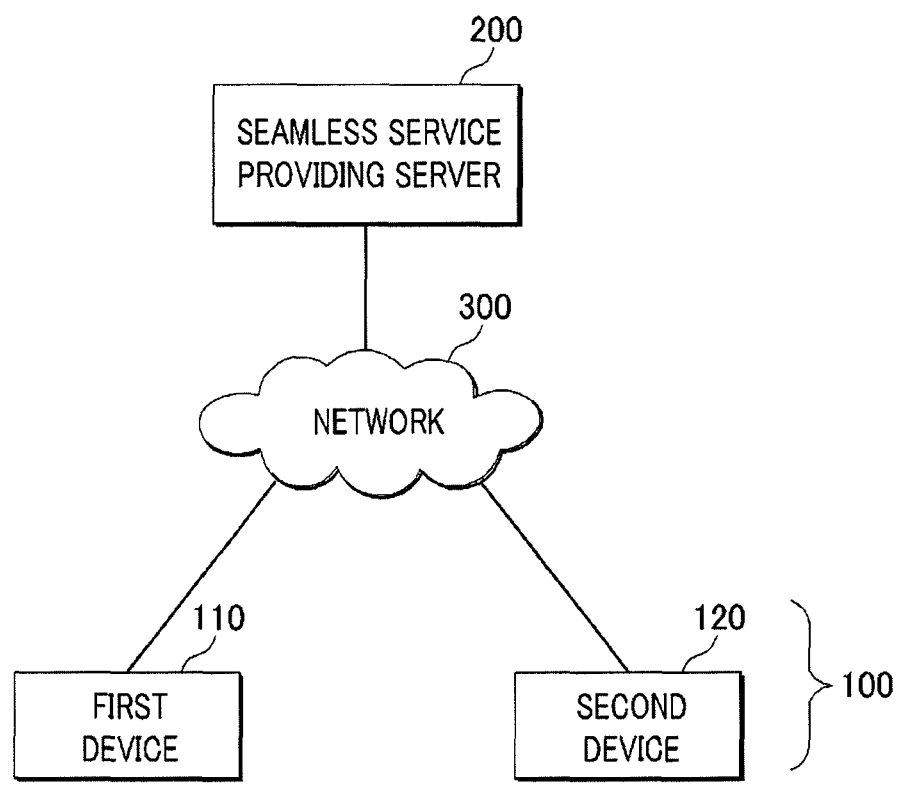
FIG. 1 is a view illustrating a configuration of contents providing system according to an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Hereinafter, exemplary embodiments will be explained in detail with reference to the accompanying drawings.

FIG. 1 is a view illustrating a configuration of a contents providing system according to an exemplary embodiment;

The contents providing system according to an exemplary embodiment includes devices 100, including a first device 110 and a second device 120, which are connected to a seamless service providing server 200 through a network 300. The seamless service providing server 200 is provided by way of an example only and not by way of a limitation, other apparatuses such as a personal computer as is known in the art may be used to process requests from the devices 100. According to an exemplary embodiment, the seamless service providing server 200 may include a processor and a memory.

Here, the network 300 may be embodied by a wired network such as a local area network (LAN), a wide area network (WAN), or a value added network (VAN), or any type of a wireless network such as a mobile radio communication network or a satellite communication network.

Each of the devices 100 may be embodied by a computer, a mobile device, and a television, which are capable of being connected to a remote server through a network. Here, the computer includes, for example, a notebook type computer equipped with a WEB browser, a desktop, a tablet, and a laptop. The mobile device is a radio communication device assuring portability and mobility and includes, for example, all types of handheld-based radio communication devices such as a personal communication system (PCS), a global system for mobile communications (GSM), a personal digital cellular (PCD), a personal handyphone system (PHS), a personal digital assistant (PDA), international mobile telecommunication (IMT)-2000, code division multiple access (CDMA)-2000, w-code division multiple access (W-CDMA), a wireless broadband Internet (Wibro) device, and a smart phone. The television may include an IPTV, an Internet TV, and a ground-wave TV. The devices 100 may each include a processor, a memory, a display screen, and/or other hardware components as is known in the art.

In order to provide contents according to an exemplary embodiment, a user may capture an image of contents being reproduced in the second device 120 by using the first device 110. The user may seamlessly watch the contents, from a time point at which the image of the contents is captured, in the first device 110. In this case, the second device 120 may stop the reproduction of the contents.

That is, if the user wants to seamlessly watch, in the first device 100, contents currently being reproduced in the second device 120, he/she may capture an image of the contents being reproduced in the second device 120 using the first device 110. The reproduction of the contents in the second device 120 can be stopped without the user inputting an operation to stop the reproduction of the contents to the second device 120.

Figure 2:
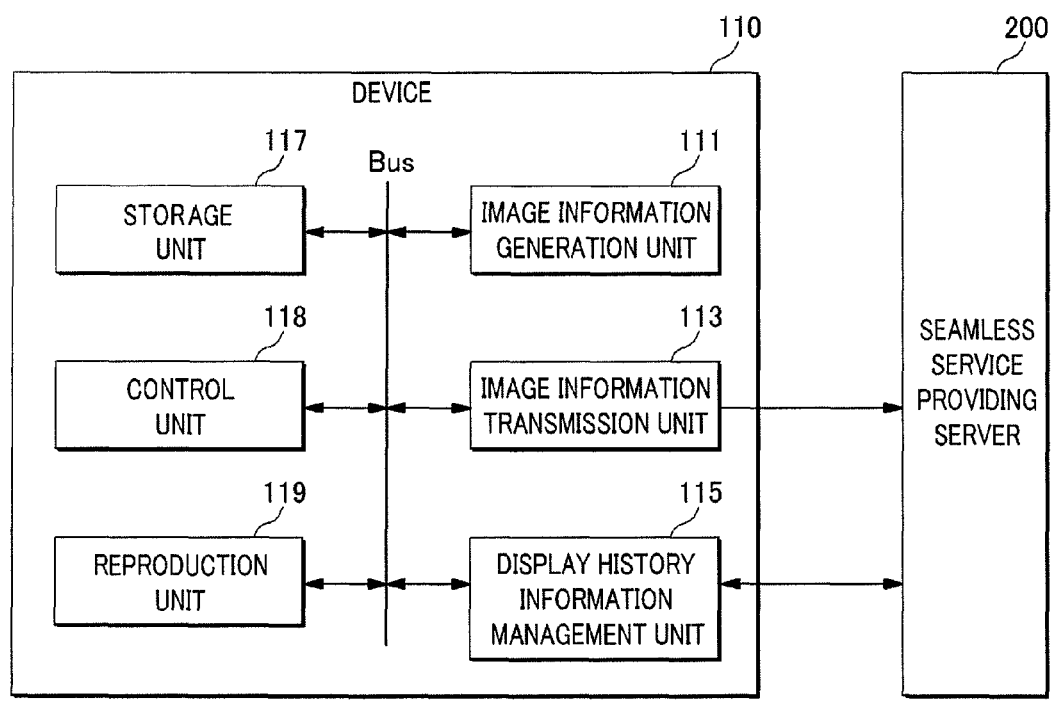
FIG. 2 is a block diagram illustrating a first device for receiving display history information according to an exemplary embodiment.

FIG. 2 is a block diagram illustrating a first device for receiving display history information according to an exemplary embodiment;

A first device 110 for receiving display history information according to an exemplary embodiment includes an image information generation unit 111, an image information transmission unit 113, a display history information management unit 115, a storage unit 117, a control unit 118, and a reproduction unit 119.

The image information generation unit 111 may capture an image of contents being reproduced in a second device (not illustrated) and generate image information about the contents. That is, the image information generation unit 111 may capture the image of the contents being reproduced in the different device and generate the image information of the contents based on the captured image.

The image information transmission unit 113 may transmit the image information of the contents generated in the image information generation unit 111 to the seamless service providing server 200.

The display history information management unit 115 may receive display history information about the contents from the seamless service providing server 200, and the display history information management unit 115 may transmit a request to stop the reproduction of the contents in the second device (not illustrated). Here, the display history information about the contents is corresponding to the image information of the contents generated in the image information generation unit 111.

The storage unit 117 may store the display history information about the contents received in the display history information management unit 115.

The control unit 118 may analyze the display history information stored in the storage unit 117. Here, the display history information about the contents may include identification information of the contents and frame information of the contents corresponding to the image information of the contents. That is, the control unit 118 may identify the contents being reproduced in the second device by using the identification information of the contents, and the control unit 118 may find a time point at which the image is captured in the image information generation unit 111 by using the frame information of the contents corresponding to the image information of the contents.

The reproduction unit 119 may reproduce the contents based on the display history information analyzed in the control unit 118 from a time point that is related to a time at which the image is captured in the image information generation unit 111. Here, the time point that is related to a time at which the image is captured may indicate a time that is a few seconds prior to the time at which the image is captured. Alternatively, the time point that is related to a time at which the image is captured may indicate a time at which the image is captured.

Figure 3:
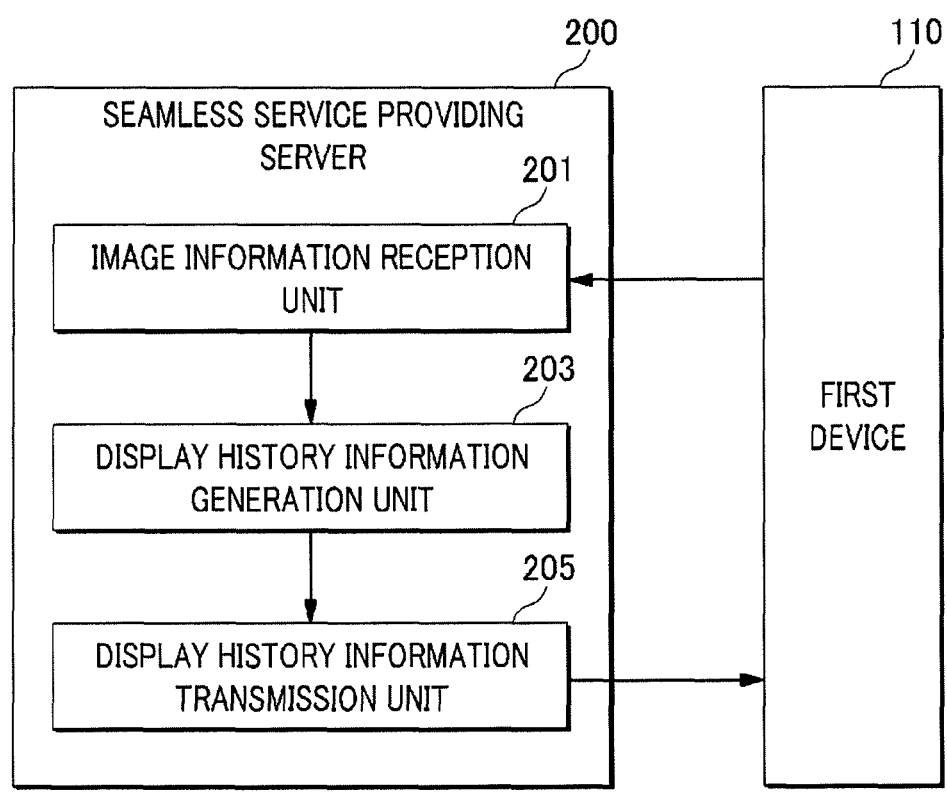
FIG. 3 is a block diagram illustrating a seamless service providing server according to an exemplary embodiment.

FIG. 3 is a block diagram illustrating a seamless service providing server according to an exemplary embodiment;

The seamless service providing server 200 according to an exemplary embodiment may include an image information reception unit 201, a display history information generation unit 203, and a display history information transmission unit 205.

The image information reception unit 201 may receive image information of contents being reproduced in a second device (not illustrated) from a first device 110.

The display history information generation unit 203 may generate display history information about the contents based on the image information of the contents received in the image information reception unit 201. Here, the display history information about the contents may include identification information of the contents and frame information of the contents corresponding to the image information. The display history information about the contents may be used to seamlessly reproduce the contents in the first device 110.

The display history information generation unit 203 may find frame information, corresponding to the image information of the contents received in the image information reception unit 201, in a database (not illustrated) storing multiple frame information of each contents classified in frame units. By matching the image information with the frame information the display history information generation unit 203 may acquire the identification information of the contents that matched with the frame information found in the database.

The display history information transmission unit 205 may transmit the display history information generated in the display history information generation unit 203 to the first device 100.

Figure 4:
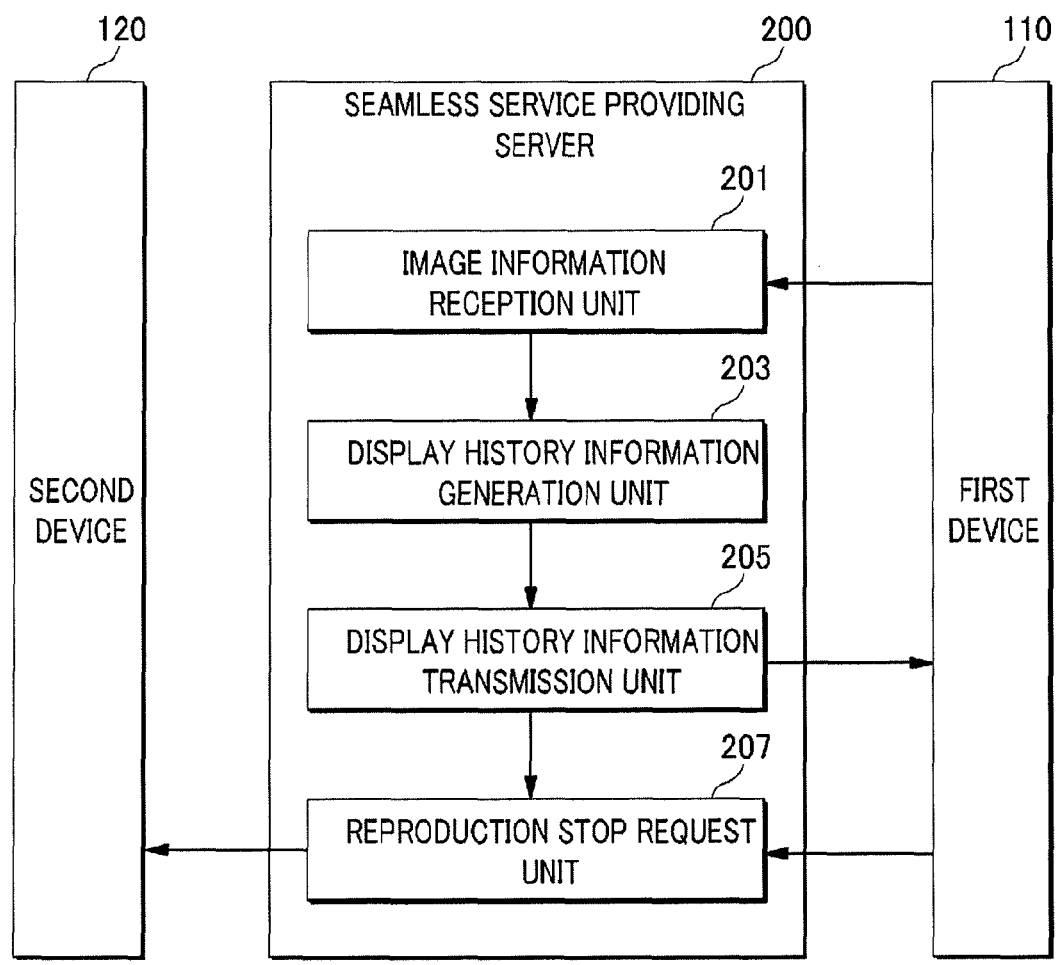
FIG. 4 is a block diagram illustrating a seamless service providing server according to another exemplary embodiment.

FIG. 4 is a block diagram illustrating a seamless service providing server according to another exemplary embodiment.

The seamless service providing server 200 according to another exemplary embodiment may include an image information reception unit 201, a display history information generation unit 203, a display history information transmission unit 205, and a reproduction stop request unit 207.

The image information reception unit 201 may receive image information of contents being reproduced in a second device 120 from a first device 110.

The display history information generation unit 203 may generate display history information about the contents based on the image information of the contents received in the image information reception unit 201. Here, the display history information about the contents may include identification information of the contents and frame information of the contents corresponding to the image information. The display history information about the contents may be used to seamlessly reproduce the contents in the first device 110.

The display history information generation unit 203 may find the frame information, corresponding to the image information of the contents received in the image information reception unit 201, in a database (not illustrated) storing multiple frame information of each contents classified in frame units. By matching the image information with the frame information the display history information generation unit 203 may acquire the identification information of the contents that matched with the frame information found in the database.

The display history information transmission unit 205 may transmit the display history information generated in the display history information generation unit 203 to the first device 110.

The display history information transmission unit 205 may also transmit the display history information to the reproduction stop request unit 207. The reproduction stop request unit 207 may receive a request to stop the reproduction of the contents in the second device 120 from the first device 110, and transmit the request to stop the reproduction of the contents to the second device 120 based on the display history information received from the display history information transmission unit 205.

When the seamless service providing server 200 transmits the request for stop of the reproduction of the contents to the second device 120 using the reproduction stop request unit 207, the reproduction of the contents being reproduced in the second device 120 may be stopped.

In an exemplary embodiment, the seamless service providing server 200 may control stopping the reproduction of the contents, as well as seamlessly reproducing contents. Accordingly, by using a device where the user wants to seamlessly watch contents, the user may capture an image of the contents being reproduced in a different device, such that the user can seamlessly watch the contents in the device. The reproduction of the contents in the different device may be stopped without particular operation to stop the reproduction in the different device.

Figure 5:
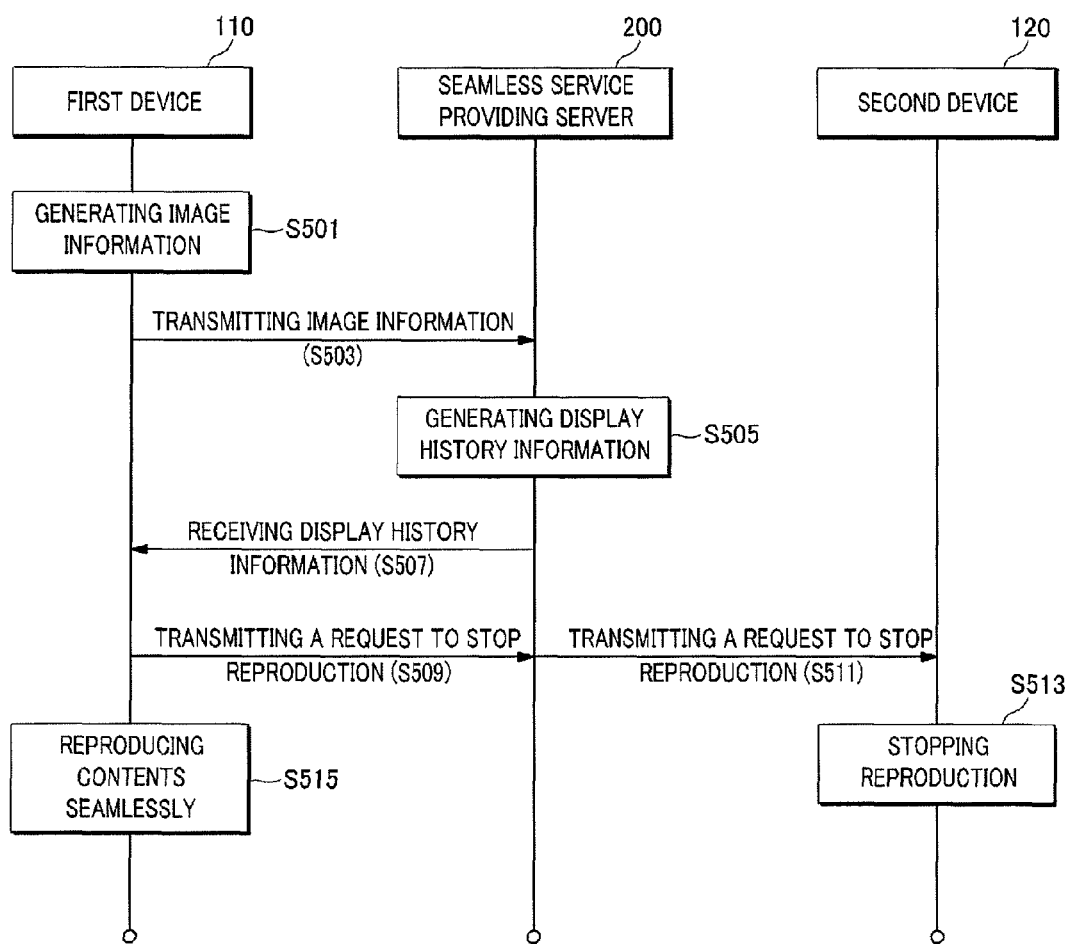
FIG. 5 is a flow diagram illustrating a contents providing method according to an exemplary embodiment.

FIG. 5 is a flow diagram illustrating a contents providing method according to an exemplary embodiment.

In operation S501, the first device 110 may generate image information of the contents by capturing an image of the contents being reproduced in the second device 120.

In operation S503, the first device 110 may transmit the generated image information of the contents to the seamless service providing server 200.

In operation S505, the seamless service providing server 200 may generate display history information based on the transmitted image information.

In operation S507, the first device 110 may receive the generated display history information from the seamless service providing server 200.

In operation S509, the first device 110 may transmit a request to stop the reproduction of the contents to the seamless service providing server 200.

In operation S511, the seamless service providing server 200 may transmit the received request to stop the reproduction of the contents to the second device.

In operation S513, upon receiving the transmitted request to stop the reproduction of the contents from the seamless service providing server 200, the second device 120 may stop the reproduction of the contents.

In operation S515, upon receiving the display history information from the seamless service providing server 200, the first device 110 may analyze the display history information and seamlessly reproduce the contents.

Here, operation S513 and operation S515 may be carried out simultaneously, but this is provided by way of an example only and not by way of a limitation.

Exemplary embodiments may be embodied in a transitory or non-transitory storage medium which includes instruction codes which are executable by a computer or processor, such as a program module which is executable by the computer or processor. A data structure according to exemplary embodiments may be stored in the storage medium and executable by the computer or processor. A computer readable medium may be any usable medium which can be accessed by the computer and includes all volatile and/or non-volatile and removable and/or non-removable media. Further, the computer readable medium may include any or all computer storage and communication media. The computer storage medium may include any or all volatile/non-volatile and removable/non-removable media embodied by a certain method or technology for storing information such as, for example, computer readable instruction code, a data structure, a program module, or other data. The communication medium may include the computer readable instruction code, the data structure, the program module, or other data of a modulated data signal such as a carrier wave, or other transmission mechanism, and includes information transmission mediums.

The above description of exemplary embodiments is provided for the purpose of illustration, and it will be understood by those skilled in the art that various changes and modifications may be made without changing a technical conception and/or any essential features of the exemplary embodiments. Thus, above-described exemplary embodiments are exemplary in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of exemplary embodiments. It shall be understood that all modifications and embodiments conceived from the meaning and scope of the claims and their equivalents are included in the scope of the present inventive concept.

What is claimed is:

1. An apparatus for using display history information, the apparatus comprising:
   an image information generation unit configured to generate image information based on an image of contents reproduced in a first device captured by the apparatus;
   an image information transmission unit configured to transmit the generated image information to a server; and
   a display history information management unit configured to control the apparatus based on the display history information which corresponds to the generated image information and which is received from the server, wherein the display history information management unit is a hardware component, and wherein the contents reproduced in the first device are reproduced by the apparatus from a location in the contents determined based on the captured image.

2. The apparatus of claim 1, wherein, after receiving the display history information, the display history information management unit transmits a request to stop the reproduction of the contents in the first device to the first device and the reproduction of the contents from the determined location is continued in the apparatus.

3. The apparatus of claim 1, further comprising:
a storage unit configured to store the received display history information.

4. The apparatus of claim 3, further comprising:
a control unit configured to analyze the stored display history information; and
a reproduction unit configured to reproduce the contents based on the analyzed display history information from a time point indicated in the image information.

5. The apparatus of claim 1, wherein the display history information comprises identification information of the contents and frame information corresponding to the image information.

6. The apparatus of claim 1, wherein the image is captured by the apparatus with a camera, wherein the image information generation unit generates the image information comprising identification of the contents and identification of a frame in the captured image.

7. The apparatus of claim 6, wherein the display history information management unit is further configured to control the apparatus to seamlessly reproduce the contents prior to a time point in which the image was captured based on a predetermined threshold and wherein the display history information indicates the time point in which the image was captured.

8. The apparatus of claim 1, wherein the apparatus is one of a mobile telephone, a tablet, and a personal digital assistant and wherein the first device is one of a personal computer and a television.

9. An apparatus for generating display history information, the apparatus comprising:
an image information reception unit configured to receive, from a first device, an image of contents captured by the first device, wherein the image is a frame of contents reproduced in a second device;
a display history information generation unit configured to generate display history information based on the received image information; and
a display history information transmission unit configured to transmit the generated display history information to the first device,
wherein the first device is controlled based on the transmitted display history information such that the contents reproduced in the second device are reproduced by the first device from a location in the contents determined based on the captured image, and
wherein the apparatus is a server configured to communicate with the first device and control seamless transition of content reproduction from the second device to the first device.

10. The apparatus of claim 9, further comprising:
a reproduction stop request unit configured to receive a request, from the first device, to stop a reproduction of the contents in the second device, and configured to transmit the request to stop the reproduction of the contents to the second device while the contents is reproduced from the determined location by the first device.

11. The apparatus of claim 10, wherein, when the reproduction stop request unit transmits the request to stop the reproduction of the contents to the second device, the reproduction of the contents in the second device is stopped.

12. The apparatus of claim 9, wherein the display history information comprises identification information of the contents and frame information corresponding to the image information of the contents.

13. The apparatus of claim 9, wherein the display history information generation unit searches for a match between contents stored in a data store and the received image information and wherein, if the match is found, the display history information retrieves identification information of the contents that matches the received image information and frame number of the contents that matches the received image information.

14. A method of using display history information, the method comprising:
generating, by a hardware component of an apparatus, image information based on an image of contents reproduced in a first device captured by the apparatus;
transmitting the generated image information to a server;
receiving display history information from the server, wherein the display history information corresponding to the transmitted image information; and
controlling the first device based on the display history information,
wherein the contents reproduced in the first device are reproduced by the apparatus from a location in the contents determined based on the captured image.

15. The method of claim 14, wherein, after receiving the display history information, transmitting a request from the apparatus to stop reproduction of the contents in the first device to the first device and the reproduction of the contents from the determined location is continued on the apparatus.

16. The method of claim 14, further comprising:
storing the received display history information in the apparatus.

17. The method of claim 16, further comprising:
analyzing the stored display history information; and
reproducing the contents, based on the analyzed display history information, from the determined location which is a time point indicated in the image information.

18. The method of claim 14, wherein the display history information comprises identification information of the contents and frame information which identifies the location in the contents at which the image is captured.

19. The method of claim 14, wherein the generating the image information comprises capturing by the apparatus an image of the contents reproduced in the first device and generating the image information based on the captured image, and wherein the method further comprises reproducing the contents by the apparatus from a time point at which the image is captured.

20. The method of claim 14, wherein the reproduction of the contents is stopped in the first device and is switched to the second device from a stop point in the first device for continuous reproduction of the contents.

* * * * *